US012636825B2

(12) United States Patent
Elliott et al.

(10) Patent No.: US 12,636,825 B2
(45) Date of Patent: May 26, 2026

(54) EXTRUDER VENT FLOW SENSOR

(71) Applicant: Entek Manufacturing LLC, Lebanon, OR (US)

(72) Inventors: Dean Justin Elliott, Albany, OR (US); Craig Allen Benjamin, Lebanon, OR (US); Stephen C. Gates, Yakima, WA (US); Albert J. Bailey, Pine Bluff, AR (US)

(73) Assignee: Entek Manufacturing LLC, Lebanon, OR (US)

( * ) Notice: Subject to any disclaimer, the term of this patent is extended or adjusted under 35 U.S.C. 154(b) by 162 days.

(21) Appl. No.: 18/559,481

(22) PCT Filed: Jun. 2, 2022

(86) PCT No.: PCT/US2022/072736

§ 371 (c)(1),
(2) Date: Nov. 7, 2023

(87) PCT Pub. No.: WO2022/256831

PCT Pub. Date: Dec. 8, 2022

(65) Prior Publication Data

US 2024/0239033 A1      Jul. 18, 2024

Related U.S. Application Data

(60) Provisional application No. 63/197,321, filed on Jun. 4, 2021.

(51) Int. Cl.
B29C 48/92        (2019.01)
B29C 48/76        (2019.01)
(Continued)

(52) U.S. Cl.
CPC ............ B29C 48/92 (2019.02); B29C 48/767 (2019.02); B29C 48/82 (2019.02); G01K 1/14 (2013.01);
(Continued)

(58) Field of Classification Search
None
See application file for complete search history.

(56) References Cited

U.S. PATENT DOCUMENTS 3,340,927 A * 9/1967 Swindells ............... B29C 48/05
165/104.19
4,125,208 A * 11/1978 Bettermann .......... B29C 48/288
366/186

(Continued)

FOREIGN PATENT DOCUMENTS

CN       205767419 U     12/2016
CN       207047376 U      2/2018
(Continued)

OTHER PUBLICATIONS

Henkel, Gasket Sealant Solutions, Apr. 19, 2021. <https://web. archive.org/web/20210419224133/https://www.henkel-adhesives. com/tn/en/products/industrial-sealants/gasketing.html> (Year: 2021).*

*Primary Examiner* — Armand Melendez
(74) *Attorney, Agent, or Firm* — Foster Garvey PC

(57) ABSTRACT

Disclosed are techniques for mitigating vent flow into a vent attachment on an extruder vent of an extruder. The vent attachment has a vent attachment port configured to release gases from the extruder vent. The techniques include monitoring temperature via a temperature probe mounted at least partly inside an interior opening of the vent attachment. The temperature probe is communicatively coupled to a programmable logic controller (PLC). A region of the vent attachment adjacent the temperature probe is cooled so as to reduce an operating temperature of the region and of the
(Continued)

temperature probe. Vent flow is detected in response to the PLC determining a rate of temperature change of the temperature probe exceeding a predetermined threshold rate and thereby indicating presence of the material in the vent attachment port.

25 Claims, 14 Drawing Sheets

(51) Int. Cl.

| | | |
|---|---|---|
| *B29C 48/82* | (2019.01) | |
| *G01K 1/14* | (2021.01) | |
| *G01K 3/00* | (2006.01) | |

(52) U.S. Cl.

CPC .... *G01K 3/005* (2013.01); *B29C 2948/92209* (2019.02); *B29C 2948/92419* (2019.02); *B29C 2948/9259* (2019.02); *B29C 2948/92885* (2019.02)

(56) References Cited

U.S. PATENT DOCUMENTS

| | | | |
|---|---|---|---|
| 4,197,268 A | 4/1980 | Anders | |
| 4,314,765 A | 2/1982 | Hotz | |
| 4,484,878 A | 11/1984 | Anders et al. | |
| 5,272,644 A * | 12/1993 | Katsumata | G05D 23/1917 |
| | | | 700/202 |
| 5,385,462 A | 1/1995 | Kodama et al. | |
| 6,220,745 B1 | 4/2001 | Kobayashi et al. | |
| 2002/0084543 A1 * | 7/2002 | Buja | B29C 45/76 |
| | | | 425/170 |
| 2014/0046465 A1 * | 2/2014 | de Oliveira Antunes | |
| | | | B29C 45/77 |
| | | | 700/97 |
| 2020/0338824 A1 * | 10/2020 | Cardon | B29C 48/525 |

FOREIGN PATENT DOCUMENTS

| | | | |
|---|---|---|---|
| CN | 209079186 U | 7/2019 | |
| DE | 3816981 A1 | 11/1989 | |
| JP | S55102523 U | 7/1980 | |
| JP | S59185641 A | 10/1984 | |
| JP | H02231122 A | 9/1990 | |
| JP | H02286314 A | 11/1990 | |
| JP | H0729363 B2 | 4/1995 | |
| JP | H08258116 A | 10/1996 | |
| JP | H09277351 A | 10/1997 | |
| JP | H10138237 A | 5/1998 | |
| JP | 2000280239 A | 10/2000 | |
| JP | 2000289092 A | 10/2000 | |
| JP | 2011224862 A | 11/2011 | |
| KR | 101697902 B1 | 1/2017 | |
| KR | 20180016078 A | 2/2018 | |
| WO | 2014085355 A1 | 6/2014 | |
| WO | 2017129502 A1 | 8/2017 | |

* cited by examiner

VENT FLOW SENSING SYSTEM
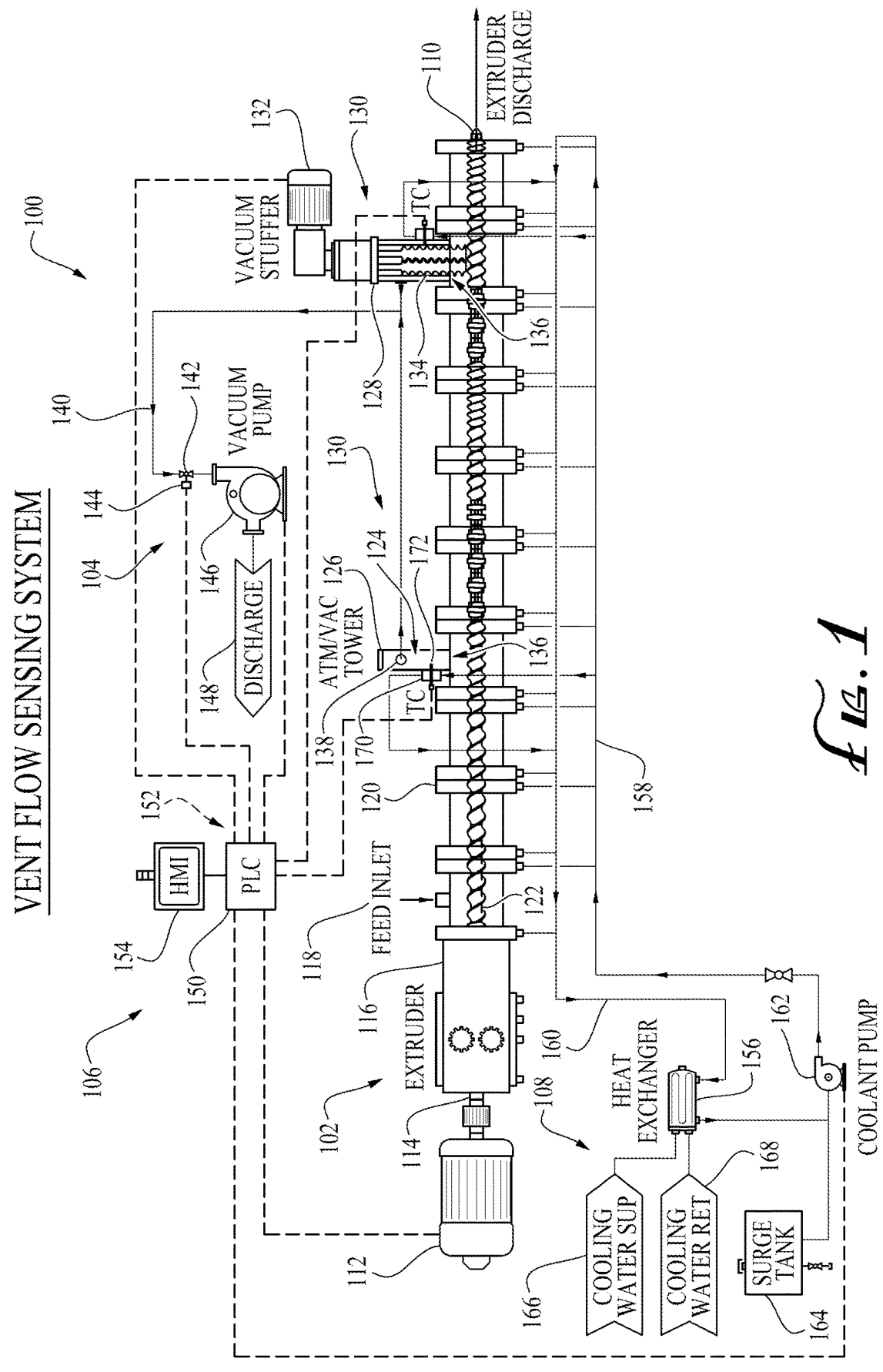
_Fig. 1_

400

138

136

172

Figure 10:
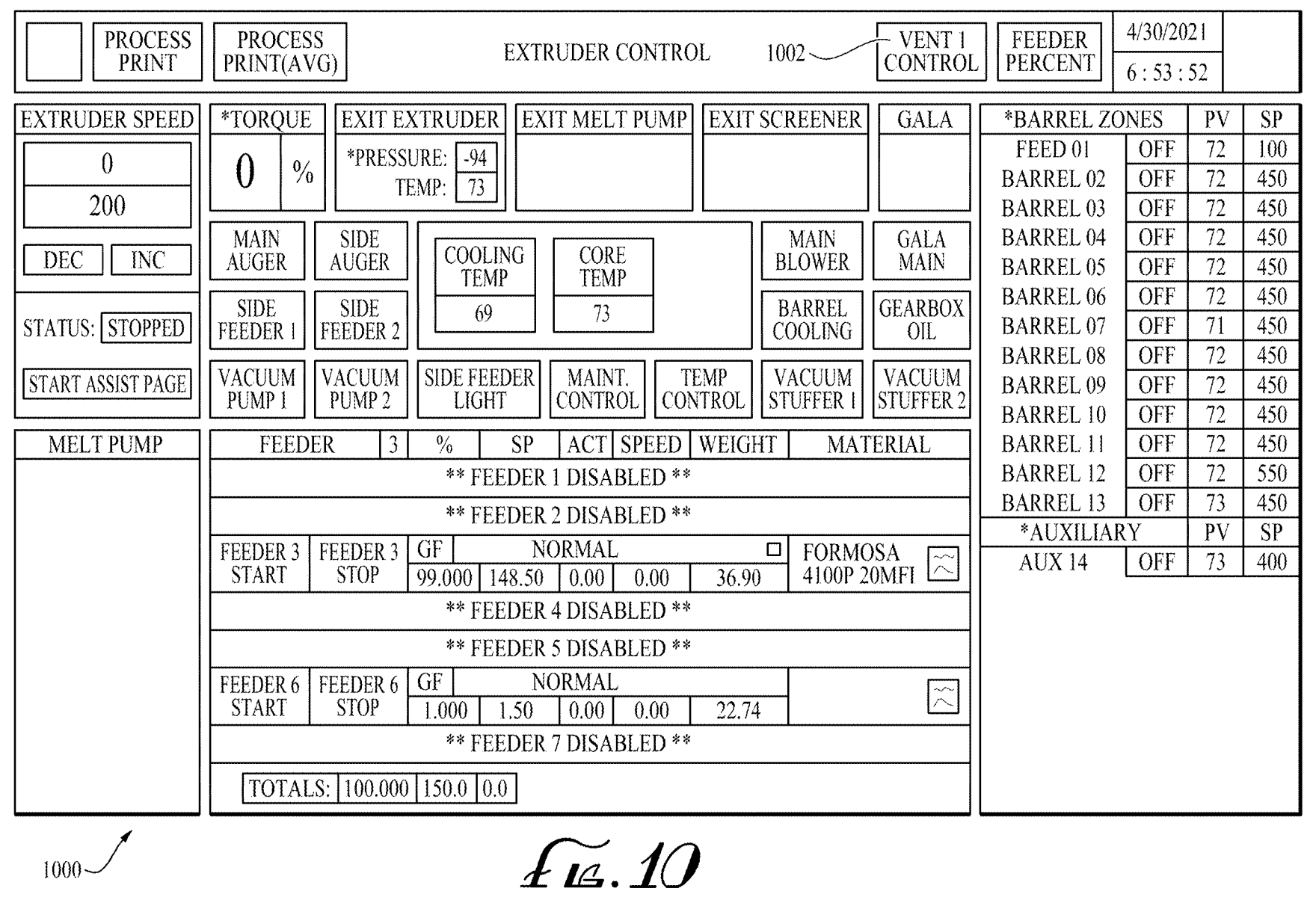

EXTRUDER CONTROL    1002

PROCESS PRINT(AVG) | FEEDER PERCENT | VENT 1 CONTROL | 4/30/2021  6:53:52

| *BARREL ZONES | | PV | SP |
|---|---|---|---|
| FEED 01 | OFF | 72 | 100 |
| BARREL 02 | OFF | 72 | 450 |
| BARREL 03 | OFF | 72 | 450 |
| BARREL 04 | OFF | 72 | 450 |
| BARREL 05 | OFF | 72 | 450 |
| BARREL 06 | OFF | 72 | 450 |
| BARREL 07 | OFF | 71 | 450 |
| BARREL 08 | OFF | 72 | 450 |
| BARREL 09 | OFF | 72 | 450 |
| BARREL 10 | OFF | 72 | 450 |
| BARREL 11 | OFF | 72 | 450 |
| BARREL 12 | OFF | 72 | 550 |
| BARREL 13 | OFF | 73 | 450 |
| *AUXILIARY | | PV | SP |
| AUX 14 | OFF | 73 | 400 |

PROCESS PRINT

EXTRUDER SPEED | *TORQUE | EXIT EXTRUDER | EXIT MELT PUMP | EXIT SCREENER | GALA 0
200
DEC  INC

0 %

*PRESSURE: -94
TEMP: 73

MAIN AUGER | SIDE AUGER | COOLING TEMP 69 | CORE TEMP 73 | MAIN BLOWER | GALA MAIN

SIDE FEEDER 1 | SIDE FEEDER 2 | | | BARREL COOLING | GEARBOX OIL

VACUUM PUMP 1 | VACUUM PUMP 2 | SIDE FEEDER LIGHT | TEMP CONTROL | VACUUM STUFFER 1 | VACUUM STUFFER 2

STATUS: STOPPED

START ASSIST PAGE

MAINT. CONTROL | MATERIAL

| FEEDER | 3 | SP | % | ACT | SPEED | WEIGHT |

FEEDER 1 DISABLED

FEEDER 2 DISABLED

| FEEDER 3 START | FEEDER 3 STOP | GF | NORMAL | | | | □ FORMOSA 4100P 20MFI |
|---|---|---|---|---|---|---|---|
| | | 99.000 | 148.50 | 0.00 | 0.00 | 36.90 | |

FEEDER 4 DISABLED

FEEDER 5 DISABLED

| FEEDER 6 START | FEEDER 6 STOP | GF | NORMAL | | | |
|---|---|---|---|---|---|---|
| | | 1.000 | 1.50 | 0.00 | 0.00 | 22.74 |

FEEDER 7 DISABLED

TOTALS: | 100.000 | 150.0 | 0.0 |

MELT PUMP

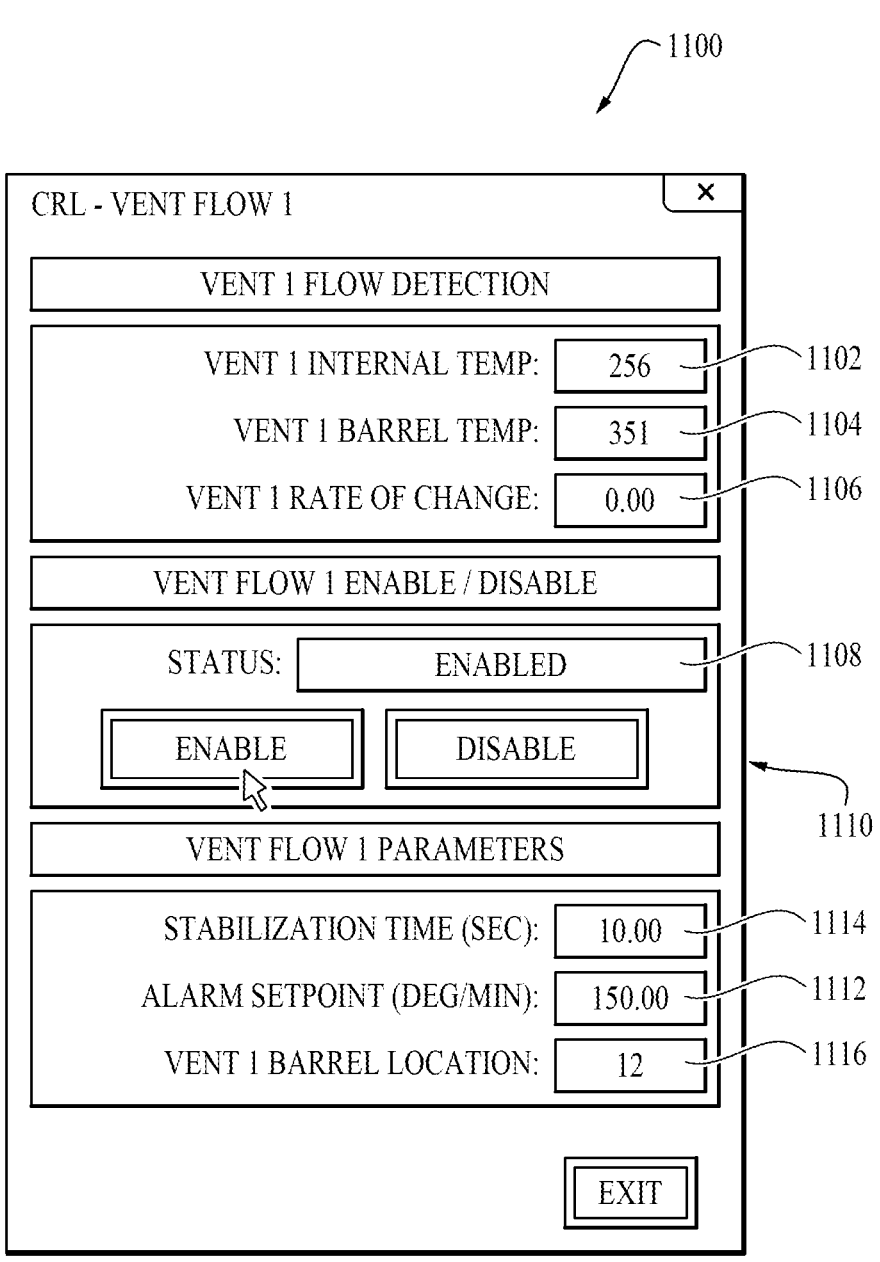
_Fig. 11_

| Alarm Name | |
|---|---|
| EXTRUDER - HmiAlarm01_07-20 | VentPort 1 VentFlowDetectedAlarm |
| EXTRUDER - HmiTWarn_01-01 | Heaters are Not Running |
| EXTRUDER - HmiWarn01 04-00 | Gearbox Lube Pump Oil Supply Temperature Low Warning |

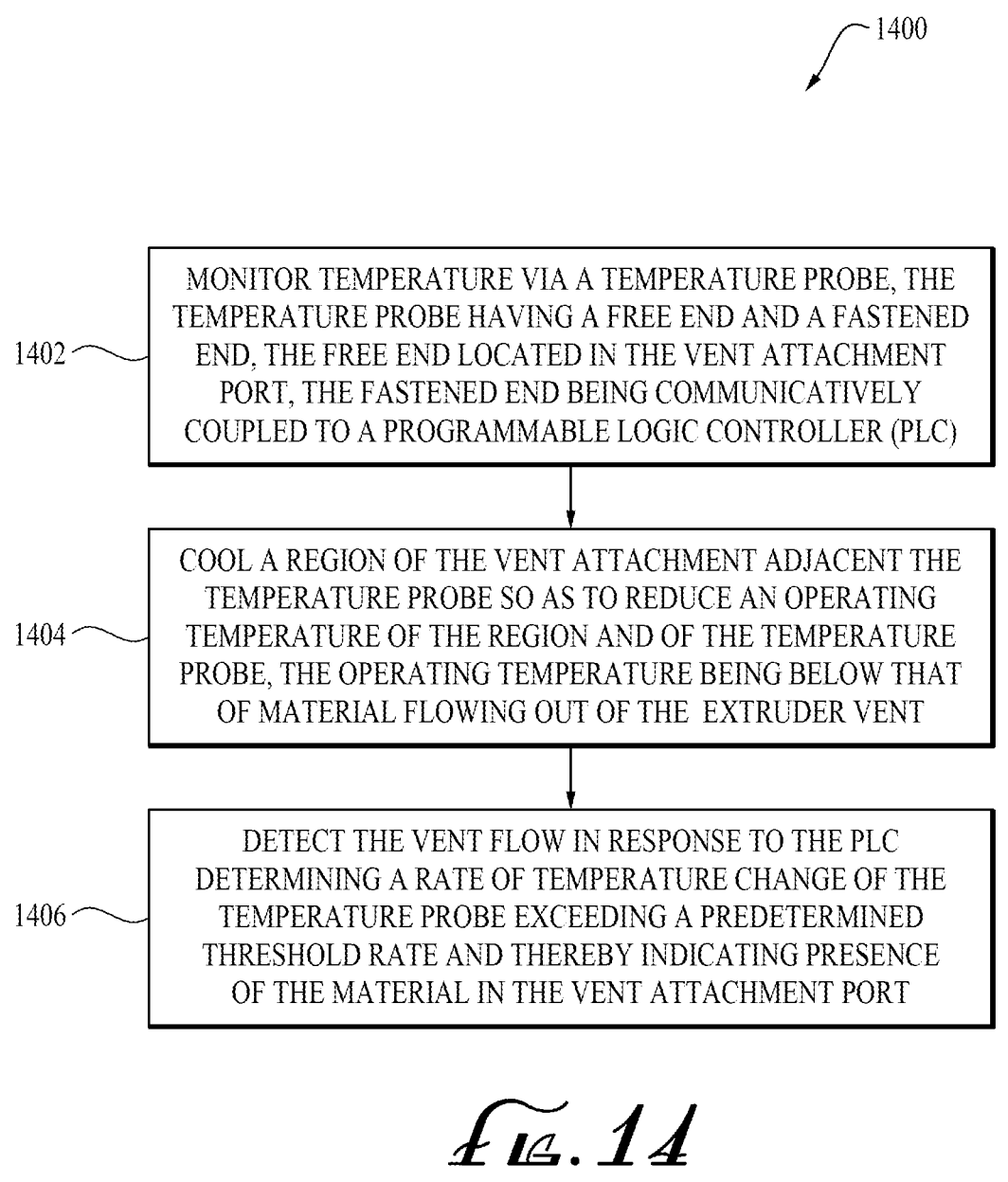

1400

1402 — MONITOR TEMPERATURE VIA A TEMPERATURE PROBE, THE TEMPERATURE PROBE HAVING A FREE END AND A FASTENED END, THE FREE END LOCATED IN THE VENT ATTACHMENT PORT, THE FASTENED END BEING COMMUNICATIVELY COUPLED TO A PROGRAMMABLE LOGIC CONTROLLER (PLC)

1404 — COOL A REGION OF THE VENT ATTACHMENT ADJACENT THE TEMPERATURE PROBE SO AS TO REDUCE AN OPERATING TEMPERATURE OF THE REGION AND OF THE TEMPERATURE PROBE, THE OPERATING TEMPERATURE BEING BELOW THAT OF MATERIAL FLOWING OUT OF THE EXTRUDER VENT

1406 — DETECT THE VENT FLOW IN RESPONSE TO THE PLC DETERMINING A RATE OF TEMPERATURE CHANGE OF THE TEMPERATURE PROBE EXCEEDING A PREDETERMINED THRESHOLD RATE AND THEREBY INDICATING PRESENCE OF THE MATERIAL IN THE VENT ATTACHMENT PORT

*FIG. 14*

EXTRUDER VENT FLOW SENSOR

RELATED APPLICATION

This application claims priority benefit of U.S. Provisional Patent Application No. 63/197,321, filed Jun. 4, 2021, which is hereby incorporated by reference in its entirety.

BACKGROUND INFORMATION

Co-rotating twin-screw extruders used for processing polymeric compounds often include atmospheric or vacuum vent openings at one or multiple locations along the barrel(s) of an extruder to release unwanted volatiles like moisture.

There are at least five processing limitations to increased throughput for a co-rotating twin-screw extruder: power, volume, shear, pressure and moisture. A sixth limitation, known as vent flow, is sometimes a line operator's toughest challenge.

Vent flow is mostly caused by three of the five main limitations—pressure, moisture or volume—however, at times it cannot be traced to any of the five main limitations, earning its independence as a sixth processing limitation. Understanding when a vent is vulnerable to vent flow and what causes vent flow is helpful to managing, minimizing, or mitigating it.

Vent flow occurs when polymeric compound flows out of a vacuum or atmospheric vent opening, preventing air and gases from escaping the extruder. Not only can vent flow cause product defects but it can also create an undesirable mess. Vent flow is sometimes an extruder operator's toughest challenge and can also limit extruder throughput rates and cause lost production time.

It is common practice for extruder operators to clear out a vent with a wood or plastic tool while the extruder is running. There are, however, examples of less experienced operators who have used steel screwdrivers, prybars, or scrapers to clear out a vent on a running extruder. Unfortunately, the outcome can potentially be catastrophic and extremely expensive when the metal tool is pulled into the extruder by the rotating screws.

Understanding when an extruder vent opening is vulnerable to vent flow and what causes vent flow is helpful to managing or mitigating it.

SUMMARY OF THE DISCLOSURE

In one aspect, a method of mitigating vent flow into a vent attachment on an extruder vent of an extruder is described. The vent attachment has a vent attachment port configured to release gases from the extruder vent. The method includes monitoring temperature via a temperature probe. The temperature probe has a free end and a fastened end. The free end is located in the vent attachment port. The fastened end is communicatively coupled to a programmable logic controller (PLC). The method includes cooling a region of the vent attachment adjacent the temperature probe so as to reduce an operating temperature of the region and of the temperature probe. The operating temperature is below that of material flowing out of the extruder vent. The method entails detecting the vent flow in response to the PLC determining a rate of temperature change of the temperature probe exceeding a predetermined threshold rate and thereby indicating presence of the material in the vent attachment port.

The method may also further include cooling the region by coupling a cooling jacket to an outer surface of the vent attachment. The method may also further include cooling the region by pumping coolant through a cooling channel associated with the vent attachment. The method may also include the vent attachment being a vacuum vent stuffer (i.e., having a vacuum in the vent attachment port) or an atmospheric vent stuffer. The method may also include the vent attachment being a vent tower having a vacuum in the vent attachment port. The method may also include the vent attachment being a vent tower at atmospheric pressure. The method may also include cooling the material in the vent attachment port to at least partly solidify it preparatory to its removal from the vent attachment. The method may also include changing rotation speed of an extruder screw in response to detecting the vent flow. The method may also include shutting off a material feed supply to the extruder in response to detecting the vent flow. The method may also include receiving a value to configure the predetermined threshold rate. The method may also include cooling the region by pumping coolant through the cooling jacket. The method may also include removing the vacuum from the vent attachment port in response to detecting the vent flow. The method may also include generating an indication of the vent flow. The method may also include presenting the indication on a human-machine interface (HMI) of the PLC. Other technical features may be readily apparent to one skilled in the art from the following figures, descriptions, and claims.

In one aspect, a programmable logic controller (PLC) for controlling an extruder is described. The extruder has an extruder vent to which a vent attachment is mounted. The vent attachment has a vent attachment port configured to release gases from the extruder vent. The PLC includes a machine-readable storage medium storing instructions thereon that, when executed, configure the PLC to monitor a temperature probe communicatively coupled to the PLC. The temperature probe has a free end located in the vent attachment port. The PLC is configured to control a cooling system for cooling a region of the vent attachment adjacent the temperature probe so as to reduce an operating temperature of the region and of the temperature probe. The operating temperature is below that of material flowing out of the extruder vent. The PLC is configured to determine a rate of temperature change of the temperature probe and generate an indication of vent flow in response to determining the rate of temperature change exceeds a predetermined threshold rate.

The PLC may also include the instructions that further configure the PLC to receive the predetermined threshold rate. The PLC may also include the instructions that further configure the PLC to present the indication on a human-machine interface (HMI). The PLC may also include the instructions that further configure the PLC to remove a vacuum from the extruder vent in response to detecting the vent flow. The PLC may also include the instructions that further configure the PLC to change rotation speed of an extruder screw in response to detecting the vent flow. The PLC may also include the instructions that further configure the PLC to shut off a material feed supply to the extruder in response to detecting the vent flow. Other technical features may be readily apparent to one skilled in the art from the following figures, descriptions, and claims.

In one aspect, a system to mitigate vent flow into a vent attachment on an extruder vent of an extruder is described. The vent attachment has a vent attachment port configured to release gases from the extruder vent. The system includes a temperature probe. The temperature probe has a free end and a fastened end. The free end is located in the vent attachment port. The fastened end is communicatively coupled to a programmable logic controller (PLC). A cooling jacket is configured to cool a region of the vent attachment adjacent the temperature probe so as to reduce an operating temperature of the region and of the temperature probe. The operating temperature is below that of material when it flows out of the extruder vent. The PLC is configured to determine a rate of temperature change of the temperature probe exceeding a predetermined threshold rate that indicates presence of the material in the vent port.

The system may also include the cooling jacket being a cooling plate mounted to a side of the vent attachment. The system may also include a vacuum pump coupled to the vent attachment. The system may also include the vent attachment being a vacuum vent stuffer or an atmospheric vent stuffer. Other technical features may be readily apparent to one skilled in the art from the following figures, descriptions, and claims.

Isolating a thermocouple has several advantages, summarized as follows: increases the differential temperature between the melt and the sensor; keeps the hot extruder barrel (below the sensor) from heating up the sensor; having a larger differential between the sensor temperature and the melt temperature increases the reliability of the sensor alarm and a reduction in the chances for false alarms; cooling of the sensor makes clean out of the vent attachment port much easier because the material that hits the sensor does not stick, as it solidifies; cleanup of the tower is easier because a cooling jacket is attached to the vent attachment, the tower is cooled and is lower in temperature than the melt, so the melt does not stick to the walls of the tower; and reduces risk of fires related to vent flow problems since the sensor would be able to shut down the machine when a vent flow condition arises.

Additional aspects and advantages will be apparent from the following detailed description of embodiments, which proceeds with reference to the accompanying drawings.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 is a mechanical flow diagram of an extruder including vent flow sensors, according to one embodiment.

FIG. 10 is a screenshot of a portion of an HMI for an extruder shown in FIG. 1.

FIG. 11 is a screenshot of another portion of the HMI for an extruder shown in FIG. 1.

FIG. 14 is a flow diagram of a process in accordance with one embodiment.

DETAILED DESCRIPTION OF EMBODIMENTS

Figure 2:
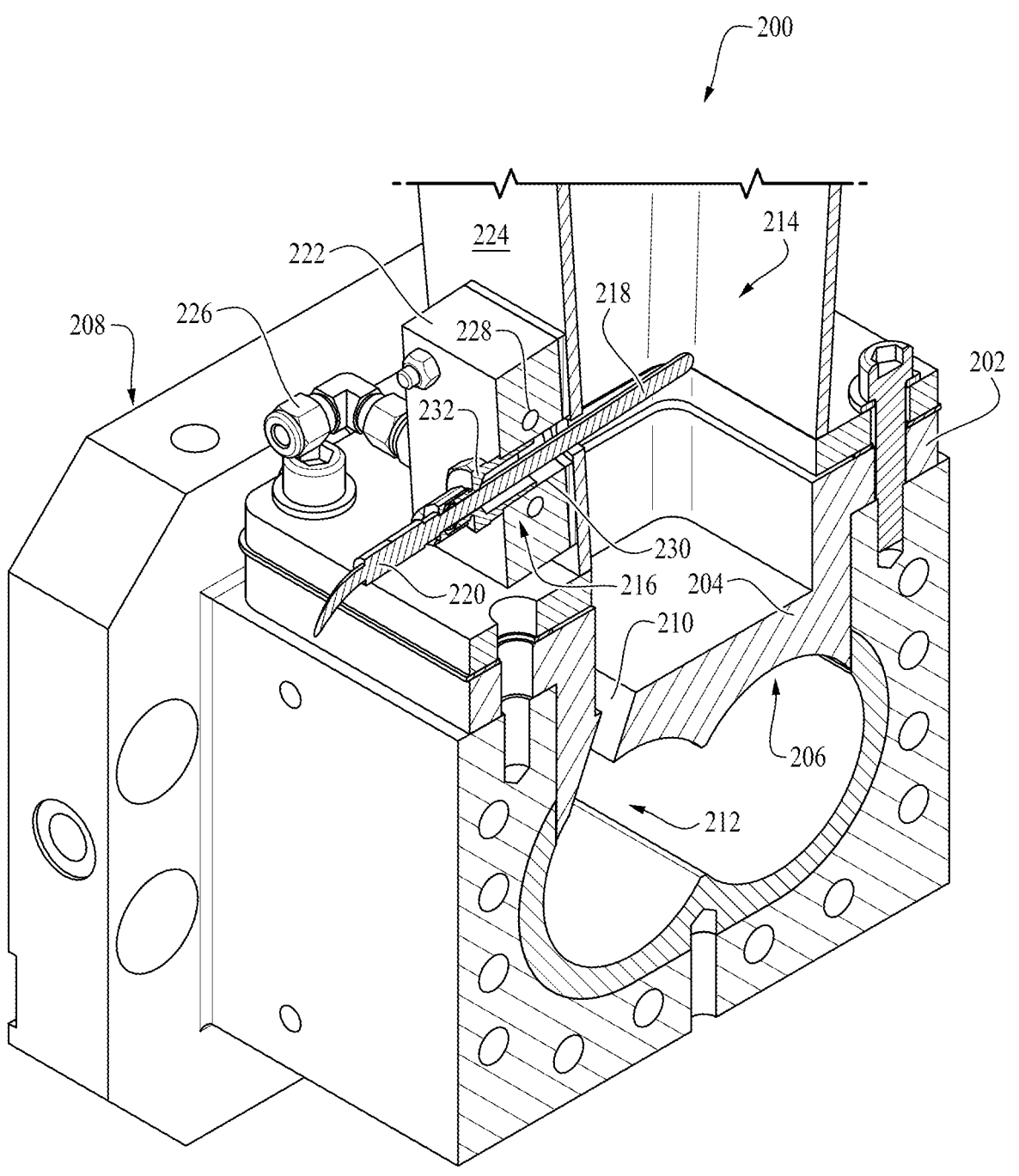
FIG. 2 is an isometric cross-sectional view of a vent attachment including a cooling jacket and thermocouple, according to one embodiment.

FIG. 1 shows an extruder system 100, according to one embodiment. In the present example, extruder system 100 includes an extruder 102, a ventilation system 104, a process control system 106, and a cooling system 108.

Extruder 102 is configured to generate extruder discharge 110 using an extruder motor 112, a drive shaft 114, a gear box 116, a feed inlet 118, a barrel segment 120, and a screw segment 122. In some embodiments, extruder 102 is a twin-screw extruder. In other embodiments, extruder 102 is a single screw extruder. Some other embodiments include different types of screw segments, such as, for example, conveying screw segments and kneading block segments. In other embodiments, an extruder includes a single screw segment or one length of barrel.

Ventilation system 104 includes a vent tower 124 covered by lid 126, and an optional vent stuffer 128. Vent tower 124 and vent stuffer 128 are each generally referred to as a vent attachment 130, and each is configured to vent gases from a corresponding barrel segment under a vacuum or at atmospheric pressure (depending on the desired configuration). Skilled persons will appreciate that in the absence of a vacuum, a vacuum vent tower or vacuum vent stuffer may act as an atmospheric vent attachment. Thus, this disclosure refers to any of the different ventilation configurations (atmospheric vent tower, vacuum vent tower, atmospheric vent stuffer, vacuum vent stuffer, or other vent structures) as a vent attachment.

Vent stuffer 128 also includes a vent stuffer motor 132 and screws 134 to resist vent flow of material 136 (e.g., polymer) from the barrel segments. Vent tower 124 and optional vent stuffer 128 each includes a vent attachment port 138, which is the interior opening of a vent attachment that may be vented at atmospheric pressure or coupled to a vacuum line 140. Vacuum line 140 is connected to a vacuum valve 142, which is controlled by a vacuum control 144. A vacuum pump 146 pulls a vacuum to remove gases to a vacuum discharge 148.

Process control system 106 includes a programmable logic controller (PLC 150). PLC 150 is configured to execute instructions, stored on a machine-readable medium, for process control over extruder 102, ventilation system 104, and cooling system 108. For example, various I/O control lines 152 are shown in broken lines to indicate electrical control signals used to measure values and actuate motors and pumps in extruder system 100, and thereby automate aspects of the extrusion process according to the instructions. A human-machine interface (HMI 154) provides a graphical user interface (GUI) for presenting system information and receiving operator instructions.

Cooling system 108 includes a heat exchanger 156, a barrel coolant cool side 158, a barrel coolant hot side 160, a coolant pump 162, a surge tank 164, a plant coolant supply 166, and a plant coolant return 168. Plant coolant supply 166 and plant coolant return 168 are typically from a plant's cooling tower water. This coolant is used to cool heat exchanger 156. In some embodiments, barrel coolant (e.g., water or oil) in extruder 102 is a closed circuit (completely separate from plant coolant supply 166 and plant coolant return 168), that flows through and is cooled by heat exchanger 156. Coolant pump 162 circulates barrel coolant through barrel segments 120 to cool them. In other embodiments, plant coolant or other coolant is pumped through an extruder.

A cooling jacket 170 is coupled to vent tower 124 so as to cool a region of it adjacent a temperature probe 172 (e.g., thermocouple) so as to reduce an operating temperature of the region and of the temperature probe. As described later, the operating temperature is reduced to be below that of material 136 that occasionally inadvertently flows up vent attachment port 138.

Although extruder system 100 is shown with one cooling system, skilled persons will appreciate that a cooling system for barrel segments may be independent from a cooling system for vent towers 124 and vent stuffers 128.

FIG. 2 shows a vent attachment 200, which may be similar to vent tower 124 of FIG. 1. Vent attachment 200 is shown mounted atop a flange 202 of a vent insert 204. Vent insert 204 fits in an opening 206 of an extruder barrel segment 208. An extruder barrel port 210 in vent insert 204 allows gases to escape from barrels 212 to a vent attachment port 214 in vent attachments 200. In some embodiments, vent insert 204 is integrally formed in extruder barrel segment 208 to provide a mount point for vent attachment 200. Vent insert 204 and opening 206 (or an integrally formed version), and extruder barrel port 210 are sometimes collectively referred to as an extruder vent, e.g., when venting gas at atmospheric pressure with no vent attachment 200.

Vent attachment 200 includes a thermocouple 216 having a free end 218 and a fastened end 220. Free end 218 is located in vent attachment port 214. Fastened end 220 is communicatively coupled to a PLC (see, e.g., PLC 150, FIG. 1). A cooling jacket 222 (e.g., a block, plate, ring, internal bored channels in a vent attachment, or other cooling device) is fastened to an exterior sidewall 224 of vent attachment 200 so as to cool a region adjacent thermocouple 216. In the present embodiment, cooling jacket 222 is an aluminum block. In other embodiments, a cooling jacket is integrally formed in a sidewall of a vent attachment.

In the present example, barrel coolant is pumped into a coolant inlet port connector 226 on cooling jacket 222 so that the barrel coolant flows through an internal channel 228 and out a barrel coolant outlet port connector (not shown), thereby cooling the region. Cooling jacket 222 includes an aperture 230 in which a thermocouple mount 232 is seated. Thermocouple mount 232 clasps fastened end 220 so that thermocouple 216 is suspended away from sides of aperture 230 and vent attachment port 214. Once thermocouple 216 is mounted to vent attachment 200, the cavity of aperture 230 may be sealed with RTV or another sealant. Cooling jacket 222 isolates thermocouple 216 from the heat of extruder barrel segment 208 and helps maintain a thermal difference between thermocouple 216 and material inadvertently flowing up from extruder barrel segment 208.

Figure 3:
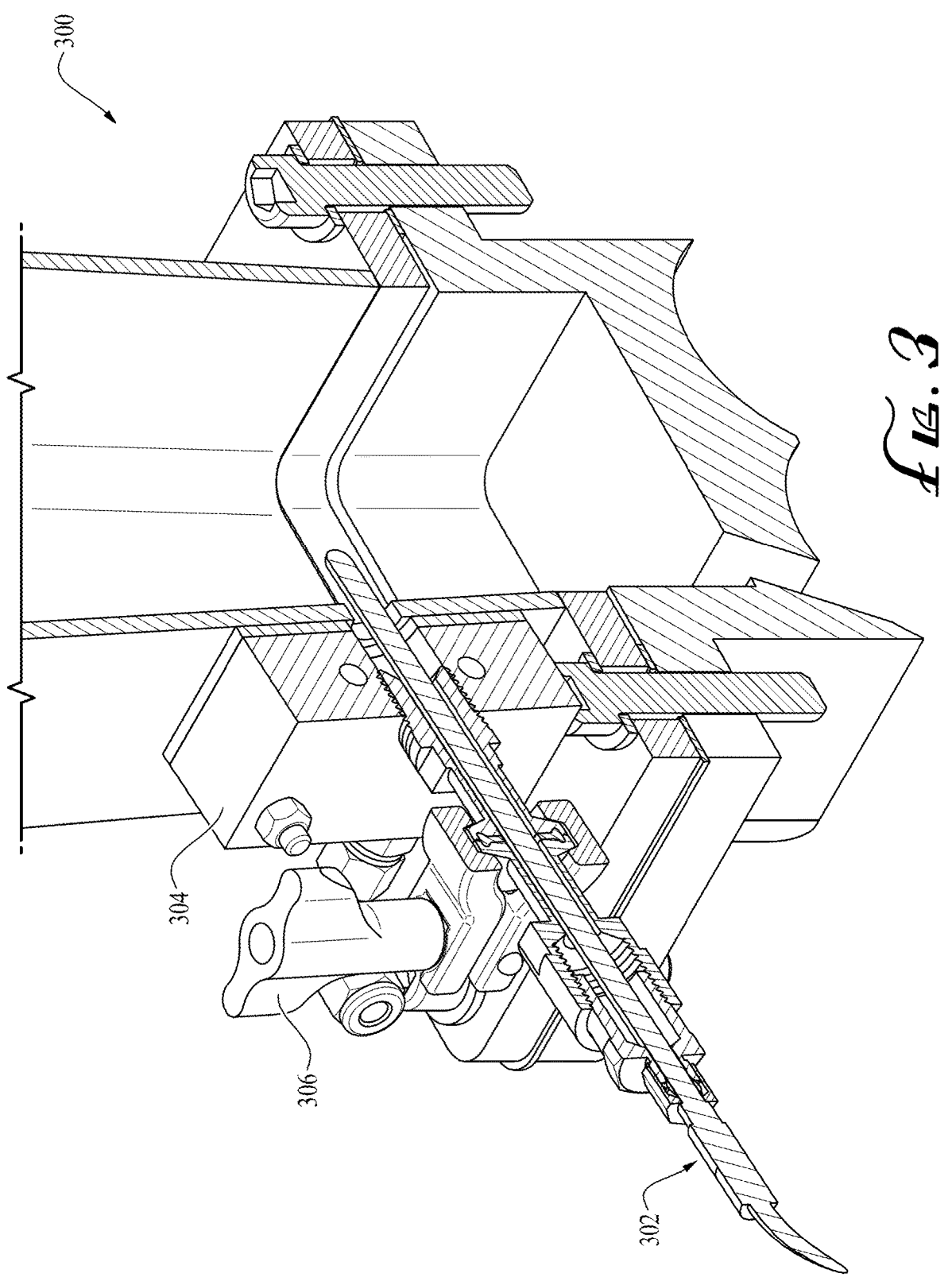
FIG. 3 is a trimeric cross-sectional view of a vent attachment including a cooling jacket and quick-release thermocouple, according to one embodiment.

FIG. 3 shows another example of a vent attachment 300, which is similar to vent attachment 200. Vent attachment 300, however, includes a thermocouple 302 that is secured to a cooling jacket 304 using quick-release half-inch sanitary fittings. Accordingly, if thermocouple 302 is fouled during a vent flow event, a threaded handle 306 is rotatable to release thermocouple 302 from cooling jacket 304 so that a new thermocouple can be installed.

Figure 4:
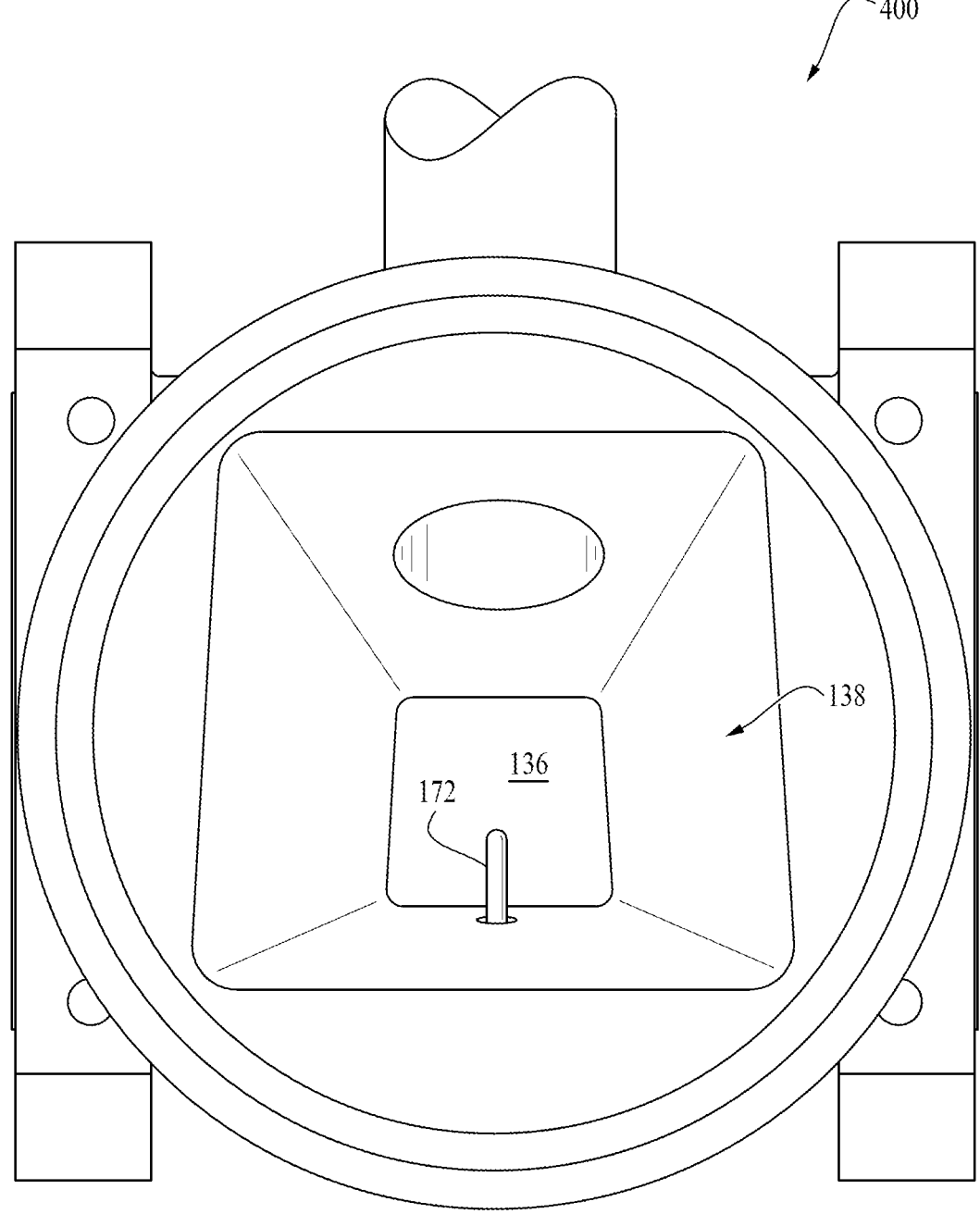
FIG. 4 is a pictorial view of an inside of a vent attachment showing a thermocouple above the polymer in an extruder.

FIG. 4 shows an initial view 400 of an extrusion process, as viewed inside vent tower 124 with its lid 126 removed. The free end of temperature probe 172 extends in the pathway of potential material 136.

Figure 5:
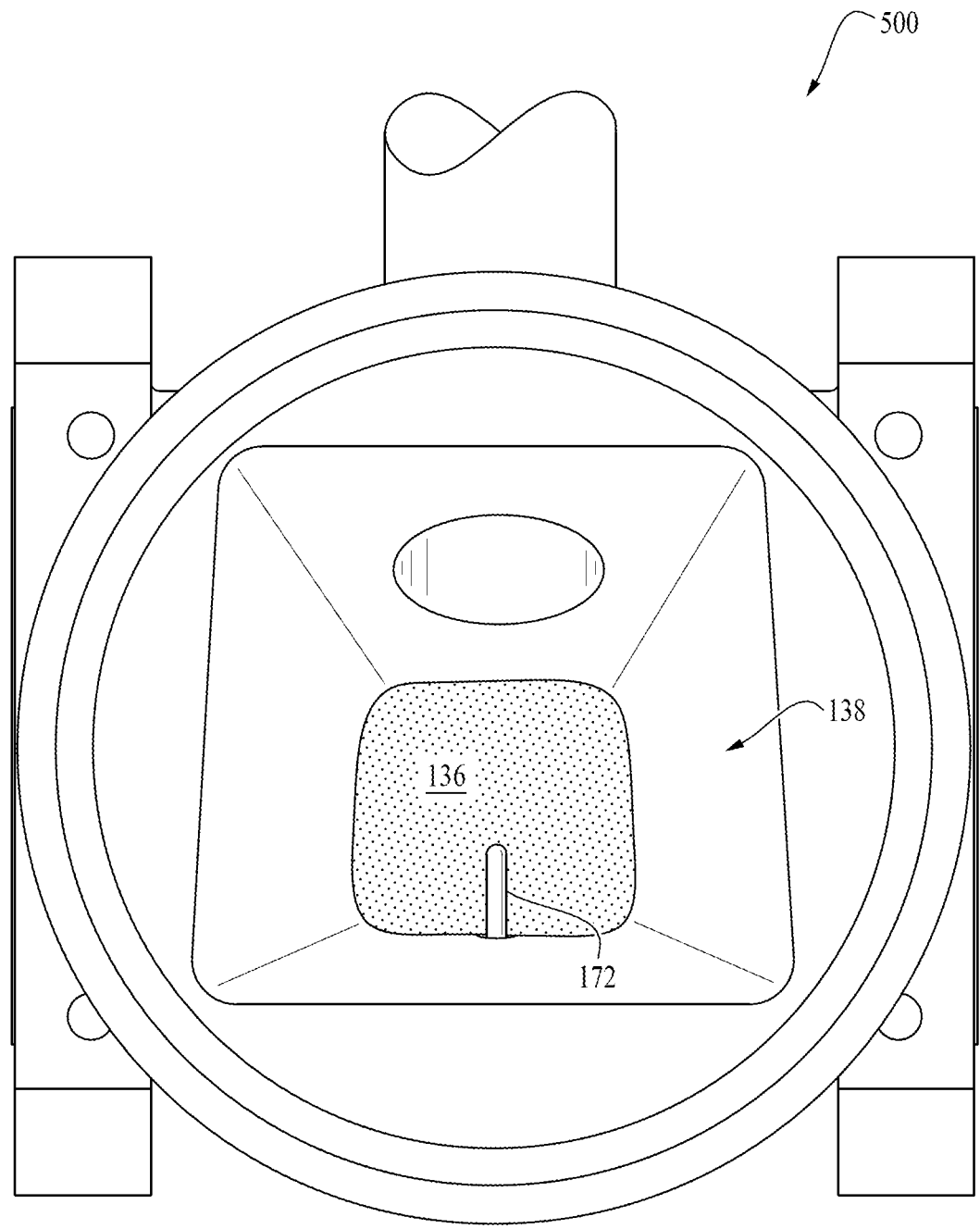
FIG. 5 is a pictorial view of an inside of the vent attachment of FIG. 4 showing the polymer contacting the thermocouple.

FIG. 5 shows a subsequent view 500 as material 136 rises up vent attachment port 138, reaching temperature probe 172. Notably, however, interior surfaces of vent tower 124 are cooled to an operating temperature being below that of material 136.

Figure 6:
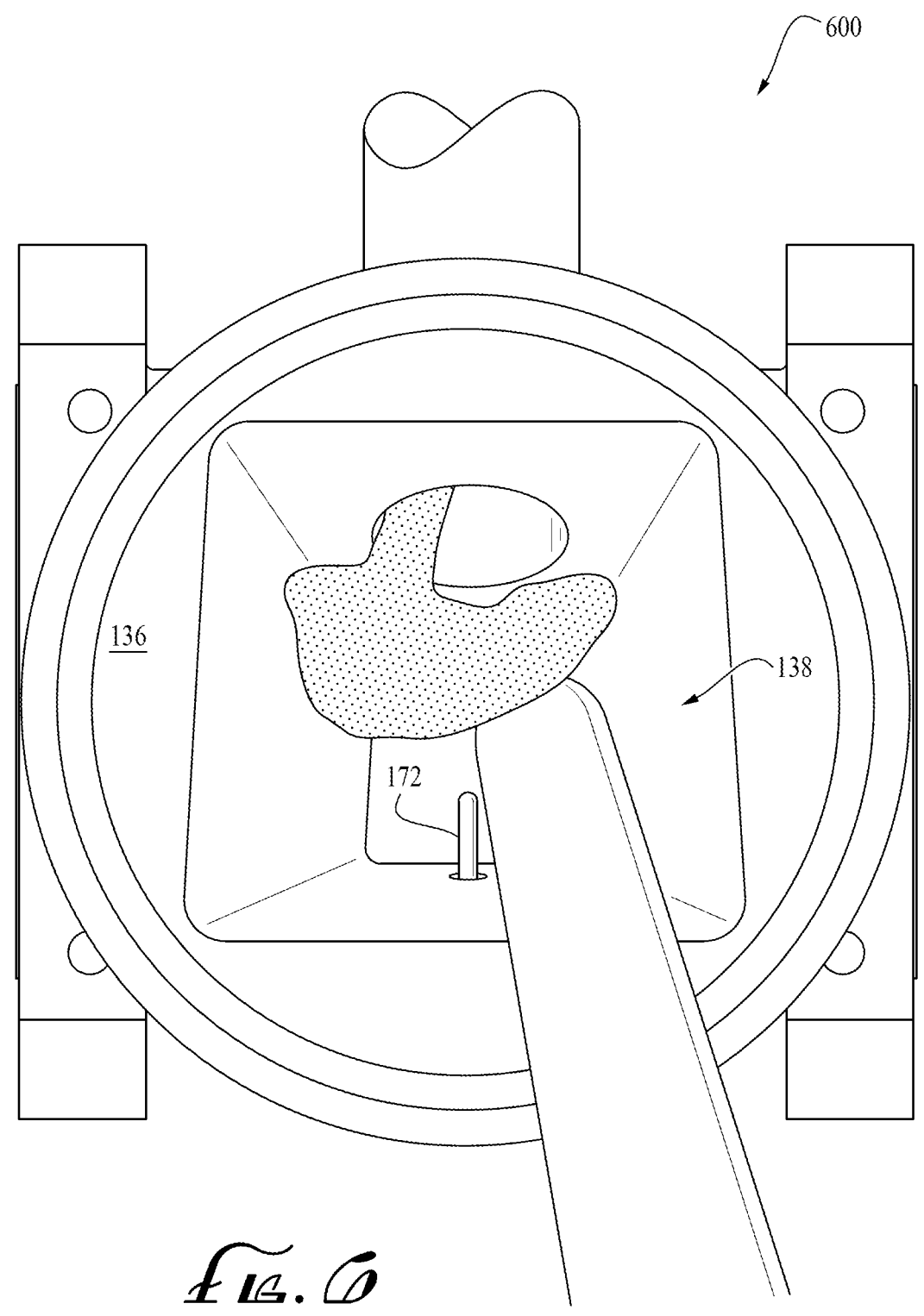
FIG. 6 is a pictorial view of an inside of the vent attachment of FIG. 5 being cleaned.

FIG. 6 shows a final view 600 as an operator clears partly solidified material 136 from the inside surface of vent attachment port 138. Because the outer skin of the material 136 is partly solidified, it may be pried cleanly from the side walls and from temperature probe 172. Accordingly, material 136 is easy to peel away.

Figure 7:
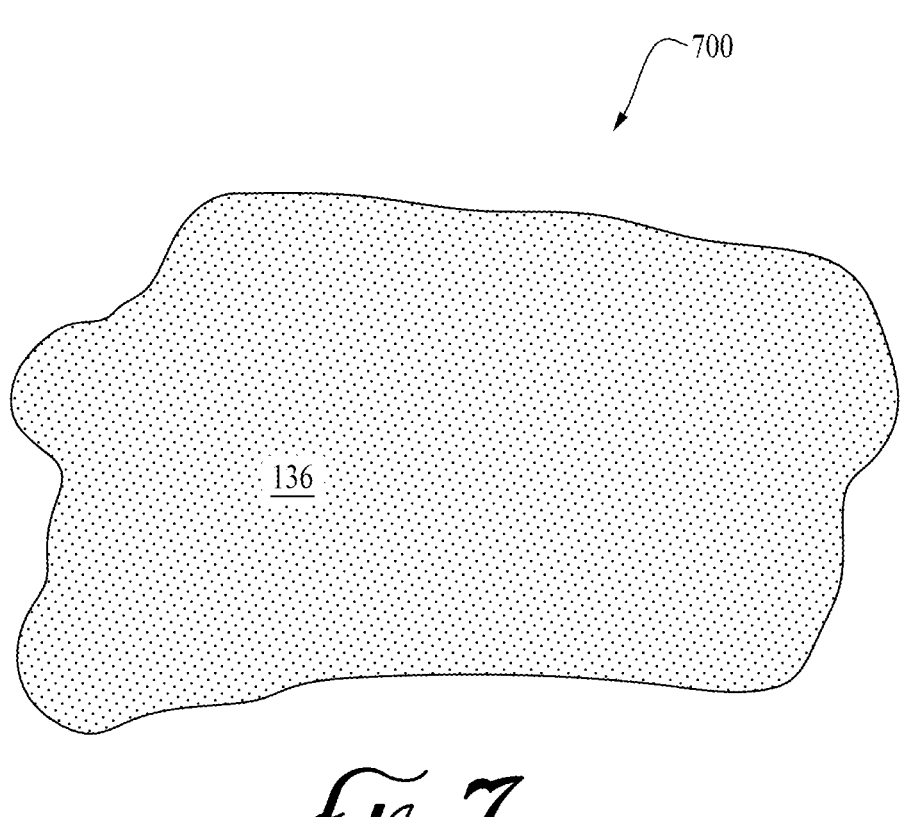
FIG. 7 is a pictorial view of a chunk of polymer cleaned from the vent attachment shown in FIG. 6.

FIG. 7 shows an enlarged view of a piece 700 of material 136 that was pried from vent attachment port 138. As shown in FIG. 7, piece 700 is removed as a substantially uniform chunk since its exterior solidified due to cooling.

Figure 8:
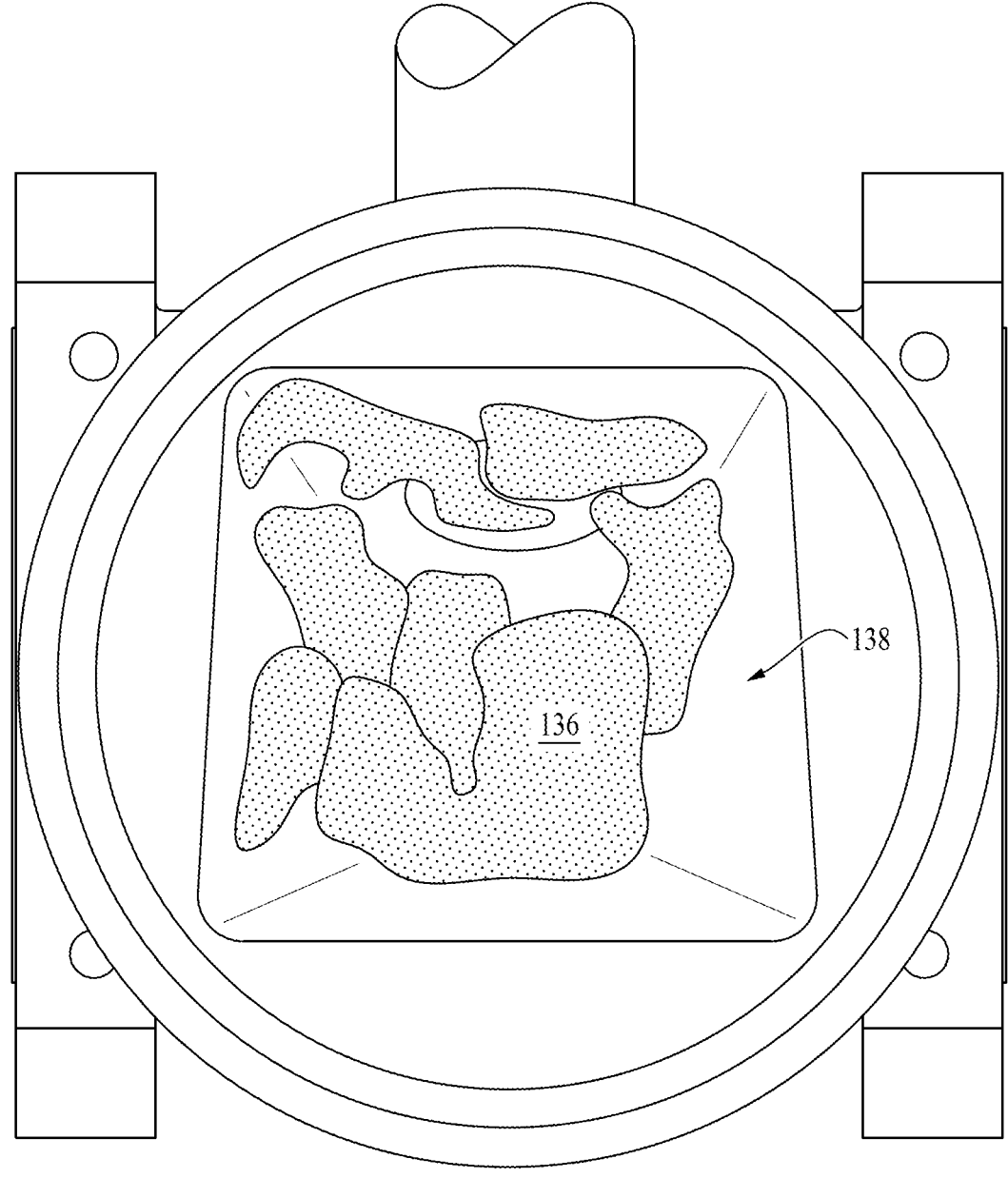
FIG. 8 is a pictorial view of a prior art implementation in which the polymer in a vent attachment was not cooled.

FIG. 8 shows a contrasting view of material 136 adhered to vent attachment port 138 because of a lack of cooling. The adhered material is not readily removable from vent attachment port 138.

Figure 9:
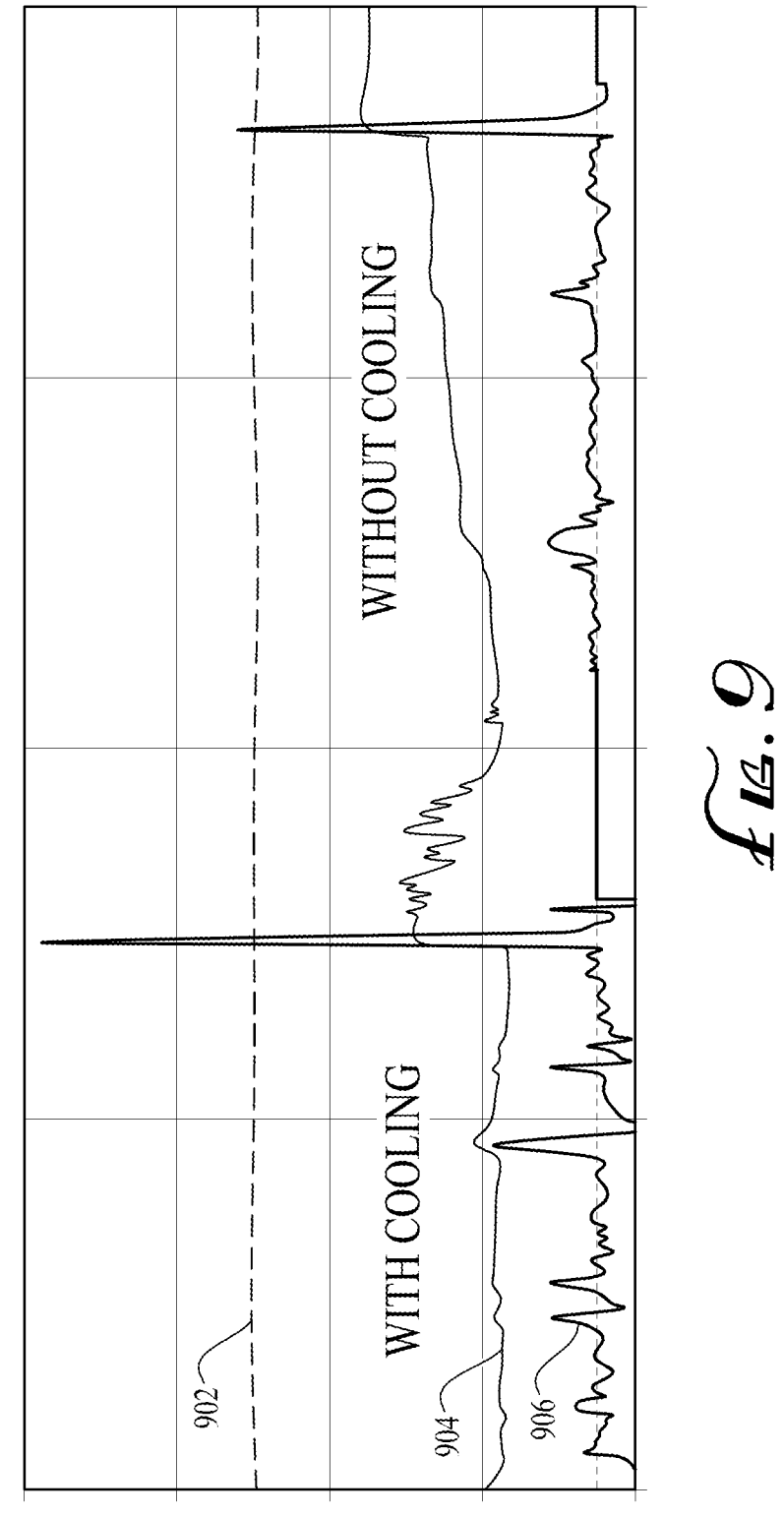
FIG. 9 is a graph showing a rate of temperature change of a vent probe inside a vent attachment detecting vent flow when the vent attachment is cooled and when it is not cooled.

FIG. 9 shows a graph 900 of two vent flow occurrences where material 136 flowed up vent attachment port 138 and made contact with temperature probe 172. A first occurrence on the left side of graph 900 shows data gathered during active cooling. A second occurrence on the right side of graph 900 shows data gathered without cooling. An upper line 902 indicates barrel temperature. A middle line 904 indicates temperature of temperature probe 172. A lower line 906 indicates a rate of temperature change in units of degrees Fahrenheit per minute. With cooling, middle line 904 is shown as much lower than upper line 902, and this temperature differential leads to a higher rate of temperature change when material 136 reaches temperature probe 172 during the first occurrence compared to the second occurrence. The following table summarizes the data.

| Cooling | Vent | Vent Probe Peak Rate of Temp. Change (° F./min) | Vent Probe Temp at Start of Occurrence (° F.) | Vent Probe Temp at End of Occurrence (° F.) | Barrel Temp (° F.) |
|---|---|---|---|---|---|
| On | Vacuum | 721 | 118 | 239 | 450 |
| Off | Vacuum | 469 | 221 | 307 | 450 |

Lower line 906 shows that when the polymer flows up and contacts temperature probe 172, the measured temperature rises rapidly, with the most rapid change when cooling was applied. Once the polymer is cleaned out, the cooling returns the system to an operable state in a reasonably quick amount of time. Without cooling, the system may not return to a functional temperature (see, e.g., the right side of middle line 904 that stays relatively close to upper line 902).

FIG. 10 shows an HMI 1000 used to configure vent flow monitoring. Each vent in a system may be individually configured. In the present example, the extruder includes a "Vent 1." To configure this vent, a user clicks on a button 1002 to launch a configuration dialog box shown in FIG. 11.

If other vents were present in the system, separate buttons would be clickable to configure those other vents.

FIG. 11 shows a vent flow detection configuration dialog box 1100. Vent flow detection configuration dialog box 1100 includes a current vent temperature measurement 1102 for "Vent 1," as measured by a temperature probe in a vent attachment (see, e.g., temperature probe 172). Vent flow detection configuration dialog box 1100 also shows a current barrel temperature measurement 1104, as measured by a different thermocouple (not shown).

An algorithm executed by PLC 150 computes a current rate of temperature change 1106, which is also displayed. The rate of temperature change is computed by taking samples of the temperature and repeatedly computing the derivative on a given set of the most recent samples. For example, PLC 150 calculates the rate of change (degrees/minute) of the temperature associated with temperature probe 172. In some embodiments, the rate of change is calculated using a P_TempIntg add on instruction (AOI) available from the sample code library of Rockwell Automation of Milwaukee, Wisconsin. When extruder 102 is started and all the feeders in the formula are running, PLC 150 optionally starts a stabilization timer. This timer will allow extruder 102 to come to equilibrium before PLC 150 will start assessing vent flow. When the stabilization timer is done, PLC 150 will start monitoring the rate of change. If the rate of change is greater than a warning setpoint, PLC 150 will trigger a vent flow warning/alarm.

Vent flow detection configuration dialog box 1100 also shows a vent flow status indicator 1108, which in the present example indicates vent flow detection is enabled. Detection of vent flow may be enabled or disabled using a corresponding enablement button 1110.

To configure a desired vent flow detection threshold and response characteristics, a desired threshold rate of change value may be entered into an alarm setpoint field 1112. Once the value shown in current rate of temperature change 1106 exceeds a predetermined threshold rate shown in alarm setpoint field 1112, vent flow is detected. Empirical testing has shown that a value that is about 30 to 50 percent below a known peak rate of temperature change is sufficient to detect vent flow while avoiding excessive false positive detections.

Vent flow detection configuration dialog box 1100 also allows a user to enter a desired stabilization time value into a stabilization time field 1114. This further reduces false positives caused by spurious changes in the rate of temperature change at startup.

Finally, vent flow detection configuration dialog box 1100 shows a barrel location field 1116 for indicating where "Vent 1" is located so that current vent temperature measurement 1102, current barrel temperature measurement 1104, and current rate of temperature change 1106 can be displayed for the proper vent attachment.

Figure 12:
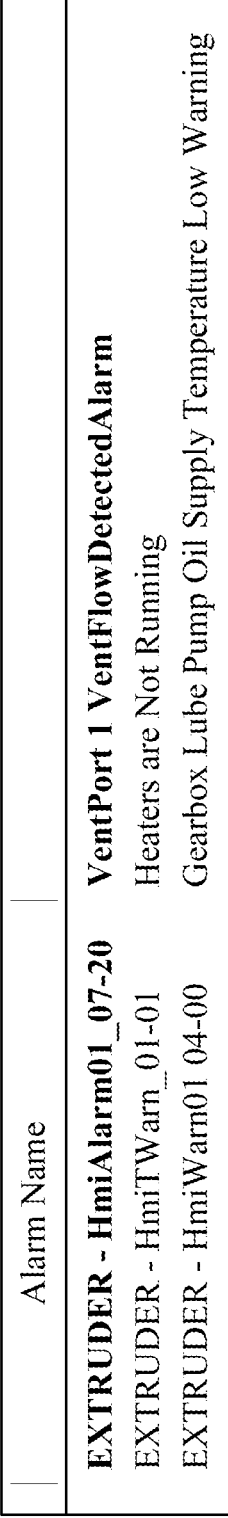
FIG. 12 is a screenshot of another portion of the HMI for an extruder shown in FIG. 1.

FIG. 12 shows an HMI alarm 1200 is generated in response to detection of the vent flow. Other indications, warnings, or alerts are also possible. For example, button 1002 (FIG. 10) and vent flow status indicator 1108 (FIG. 11) may flash red. Other automated responses are also possible. For example, PLC 150 may remove (isolate or stop) a vacuum from the vent attachment in response to detecting the vent flow by, e.g., controlling vacuum valve 142 or otherwise stopping vacuum pump 146. In other embodiments, PLC 150 may change (e.g., stop) rotation, including rotation speed, of an extruder screw (singular and/or plural) in response to detecting the vent flow.

Figure 13:
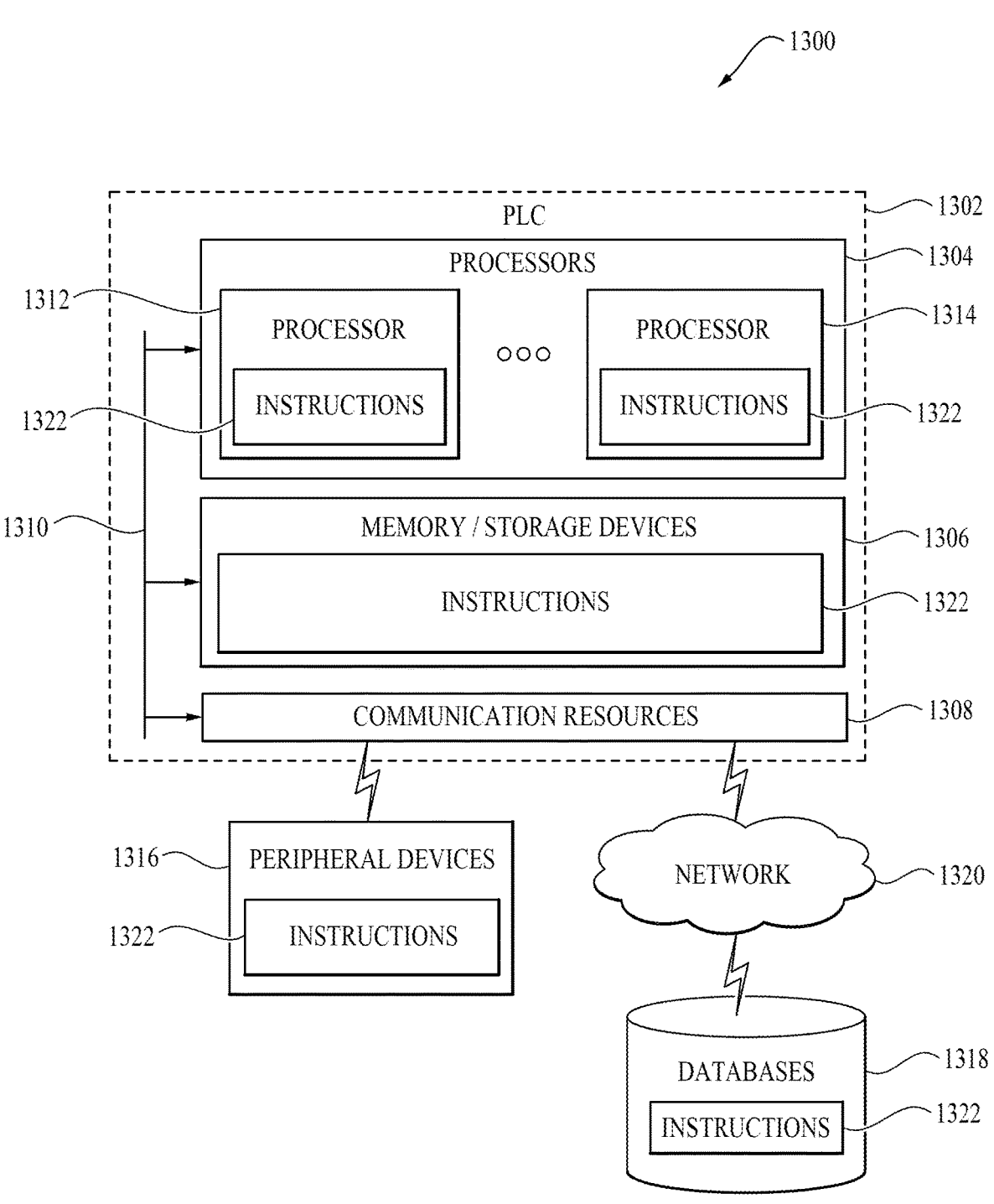
FIG. 13 is a block diagram of computing components in accordance with one embodiment.

FIG. 13 is a block diagram illustrating extruder control components 1300, according to some example embodiments, able to read instructions from a machine-readable or computer-readable medium (e.g., a non-transitory machine-readable storage medium) and perform any one or more of the methods discussed herein. For example, extruder control components 1300 may be employed as process control system 106 configured to present the HMI shown in FIG. 10, FIG. 11, and FIG. 12.

Specifically, FIG. 13 shows a diagrammatic representation of a PLC 1302 including one or more processors 1304 (or processor cores), one or more memory/storage devices 1306, and one or more communication resources 1308, each of which may be communicatively coupled via a bus 1310.

Processors 1304 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1312 and a processor 1314.

Memory/storage devices 1306 may include main memory, disk storage, or any suitable combination thereof. Memory/storage devices 1306 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), flash memory, solid-state storage, etc.

Communication resources 1308 may include interconnection or network interface components or other suitable devices to communicate with one or more peripheral devices 1316 or one or more databases 1318 via a network 1320. For example, communication resources 1308 may include wired communication components (e.g., for coupling via a Universal Serial Bus (USB)), cellular communication components, NFC components, Bluetooth® components (e.g., Bluetooth® Low Energy), Wi-Fi® components, and other communication components.

In one example, peripheral devices 1316 include thermocouple interfaces for PLC 1302. An example interface is an Allen-Bradley 1769-IT6 six channel thermocouple/mV input module available from Rockwell Automation.

Instructions 1322 may comprise software, a program, an application, an applet, an app, or other executable code for causing at least any of the processors 1304 to perform any one or more of the methods discussed herein. Instructions 1322 may reside, completely or partially, within at least one of processors 1304 (e.g., within the processor's cache memory), memory/storage devices 1306, or any suitable combination thereof. Furthermore, any portion of instructions 1322 may be transferred to PLC 1302 from any combination of peripheral devices 1316 or databases 1318. Accordingly, memory of the processors 1304, memory/storage devices 1306, peripheral devices 1316, and databases 1318 are examples of computer-readable and machine-readable media.

FIG. 14 shows a process 1400 for mitigating vent flow into a vent attachment on an extruder vent of an extruder. In block 1402, process 1400 monitors temperature via a temperature probe, the temperature probe having a free end and a fastened end, the free end located in the vent attachment port, and the fastened end being communicatively coupled to a programmable logic controller (PLC). In block 1404, process 1400 cools a region of the vent attachment adjacent the temperature probe so as to reduce an operating temperature of the region and of the temperature probe, the operating temperature being below that of material flowing out of the extruder vent. In block 1406, process 1400 detects the vent flow in response to the PLC determining a rate of temperature change of the temperature probe exceeding a predetermined threshold rate and thereby indicating presence of the material in the vent attachment port.

Skilled persons will appreciate that many changes may be made to the details of the above-described embodiments without departing from the underlying principles of the invention. The scope of the present invention should, therefore, be determined only by the following claims and equivalents.

The invention claimed is:

1. A system to mitigate vent flow into a vent attachment on an extruder vent of an extruder, the vent attachment having a vent attachment port configured to release gases from the extruder vent, the system comprising:

a temperature probe having a free end and a fastened end, the free end located in the vent attachment port, the fastened end being communicatively coupled to a programmable logic controller (PLC);

a cooling jacket configured to cool a region of the vent attachment adjacent the temperature probe so as to reduce an operating temperature of the region and of the temperature probe, the operating temperature being below that of material when it flows out of the extruder vent; and the PLC configured to determine a rate of temperature increase of the temperature probe exceeding a predetermined threshold rate that indicates presence of the material in the vent attachment port, and initiate a mitigation response when the predetermined threshold rate is exceeded.

2. The system of claim 1, in which the cooling jacket is a cooling plate mounted to a side of the vent attachment.

3. The system of claim 1, further comprising a vacuum pump coupled to the vent attachment.

4. The system of claim 1, in which the vent attachment is a vacuum vent stuffer.

5. The system of claim 1, in which the temperature probe is a thermocouple.

6. The system of claim 1, in which the cooling jacket comprises internal cooling channels for fluid circulation.

7. The system of claim 1, further comprising a coolant source and a pump configured to circulate coolant through the cooling jacket.

8. The system of claim 1, further comprising a thermocouple mount coupled to the cooling jacket.

9. The system of claim 1, in which the temperature probe is secured to the cooling jacket using a quick-release fitting.

10. The system of claim 1, further comprising a sealant configured to seal the temperature probe within an aperture of the cooling jacket.

11. The system of claim 1, further comprising a heat exchanger for cooling the coolant supplied to the cooling jacket.

12. The system of claim 1, further comprising an HMI configured to display temperature readings and vent flow status.

13. The system of claim 12, in which the PLC is configured to receive a user-specified rate-of-change threshold via the HMI.

14. The system of claim 1, in which the vent attachment is a vent tower or vent stuffer operable at either atmospheric pressure or under vacuum.

15. The system of claim 1, in which the PLC is further configured to disable vacuum applied to the vent attachment in response to detecting vent flow.

16. The system of claim 1, in which the PLC is further configured to modify a stabilization timer associated with vent flow detection before assessing vent flow.

17. The system of claim 1, in which the PLC is configured to compute the rate of temperature increase using a sampling algorithm that calculates the derivative over a sliding window.

18. The system of claim 1, in which the PLC is configured to initiate vent flow detection only after a stabilization period.

19. The system of claim 1, in which the cooling jacket comprises an aluminum block.

20. The system of claim 1, in which the temperature probe is suspended away from walls of the vent attachment.

21. The system of claim 1, in which the PLC is configured to trigger a visual or audible alarm upon detecting vent flow.

22. The system of claim 1, in which the temperature probe is located above a normal level of material flow in the extruder.

23. The system of claim 1, in which the PLC is configured to shut down or reduce feed rate to the extruder in response to vent flow detection.

24. The system of claim 1, in which the PLC is configured to store historical temperature and rate of change data for analysis.

25. The system of claim 1, in which the vent attachment includes a lid configured to reduce material ejection during vent flow.

* * * * *